United States Patent Office 3,181,993
Patented May 4, 1965

3,181,993
WATER-SOLUBLE SALICYLIC ACID DERIVATIVES AS ANALGESICS AND ANTIPYRETICS
Remsen T. Schenck, Bangor, Pa., assignor to Keystone Chemurgic Corporation, Bethlehem, Pa., a corporation of Pennsylvania
No Drawing. Filed Aug. 17, 1959, Ser. No. 833,967
The portion of the term of the patent subsequent to Aug. 18, 1976, has been disclaimed
4 Claims. (Cl. 167—65)

This application is a continuation-in-part of my co-pending application, Serial No. 644,486, filed March 7, 1957, now matured into U.S. Patent No. 2,900,410, issued August 18, 1959.

This invention relates to water-soluble derivatives of salicylic acid and to pharmaceutical preparations containing such derivatives. More particularly, it relates to water-soluble sulfoalkyl and sulfoaralkyl acylsalicylates, such as, for example the sodium salt of γ-sulfopropyl acetylsalicylic ester, and to pharmaceutical preparations of such derivatives having analgesic and antipyretic properties.

Salicylic acid and some of its derivatives occupy a very important place in the pharmacopoeia. They are widely and extensively used in analgesics, to ameliorate low-level pain. As they have a decided antipyretic effect, they are often employed to moderate and control fevers, particularly in children. They have also a specific action against rheumatism and arthritis; the treatment is in this case doubly beneficial, in that salicylate therapy at the same time alleviates the discomfort and has a curative influence on its cause. The toxicity of salicylates is so low that cases of poisoning are almost unknown when the drugs are used in recommended dosages. Salicylic acid and sodium salicylate are somewhat more toxic than certain derivatives; the commonest forms are therefore acetylsalicylic acid, salicylsalicylic acid and salicylamide. Salicylates in general are almost free from side-reactions: idiosyncrasies are rarely encountered, and other untoward effects are both uncommon and unimportant.

Since the salicylic acid derivatives which combine the greatest effectiveness with the lowest toxicity, such as acetylsalicyclic acid, salicylsalicylic acid and salicylamide are soluble in water only to the extent of a fraction of 1%, they are invariably dispensed in the solid state, in the form of tablets, capsules or powders. For the most part this is satisfactory, but in certain cases it is not possible to administer a solid drug. An appreciable fraction of the adult population, for instance, is incapable of swallowing a capsule or tablet; any attempt to do so excites a gag reflex, and the dose is regurgitated. Children present a problem too: they often refuse to swallow a tablet, especially one with the sour, acrid taste of a salicylate, and if it is sugar-coated to disguise this, the risk is incurred that it will be regarded as "candy" and consumed to excess surreptitiously. Needed salicylate therapy may also be impossible to administer in the solid form to some medical patients. The unconscious, the greatly debilitated, those with esophagal defects, are all incapable of swallowing a tablet.

It has long been agreed, in the pharmaceutical arts, that these drawbacks would be overcome if a method could be found to administer a suitable salicylic acid derivative in solution. Such a solution would offer no obstacle to those who cannot swallow a tablet, it could be mixed with milk, fruit juice or any of a dozen common beverages for children, and it could be given by nasal tube or even hypodermically when necessary. There are two possible ways of achieving this: one of the presently approved salicylates might be dissolved in some solvent other than water, or a satisfactory new, water-soluble derivative might be developed.

The former alternative does not appear to hold any promise. Many solvents have been tested without success. Those which have sufficient solvent power are too toxic; those which are safe to use either are poor solvents or promote decomposition of the solute.

The other possibility has also been extensively tested. Sodium salicylate is very soluble in water, and may sometimes be used. It is not well regarded, however, as its toxicity is unduly high and it has a tendency to cause gastro-intestinal irritation. Acetylsalicylic acid is highly recommended, since in it both toxicity and side-reactons are at a minimum. It forms salts of high water solubility, but these are unfortunately extremely unstable, even in the dry state. Neutralization of the carboxyl group in acetylsalicylic acid seems to make the acetyl linkage extraordinarily sensitive to hydrolysis; acetic acid is liberated at once, under even the mildest conditions, and the decomposition proceeds rapidly. Salicylsalicylic acid behaves similarly. No problem of instability to hydrolysis exists with salicylamide. It has no free carboxyl group to form a salt, and thus cannot be rendered soluble in the above manner. It can, however, be very finely divided and suspended in water to form a liquid preparation of fair stability. The need is only partially met by such a suspension, because settling will occur with any practicable degree of subdivision of the drug, and because the pharmacologic properties of salicylamide are sufficiently different from those of acetylsalicylic acid so that the two are not always interchangeable.

One aspect of the present invention involves the discovery that a derivative of acetylsalicylic acid in which a short carbon chain bearing a sulfonic acid group is linked to the nucleus through the carboxyl group is very soluble in water, and gives an essentially neutral solution. It has further been proven to have an analgesic activity slightly higher, and a toxicity slightly lower, than acetylsalicylic acid itself. Hydrolysis in solution is very slow, a small fraction as fast as with acetylsalicylic acid, and can be further reduced without impairing the solubility by the addition of innocuous adjuvants such as sugars, glycerine, sorbitol and the like.

Substances of this type are easily and economically prepared through the reaction of a sultone with the salt of the corresponding carboxylic acid. A sultone is the inner ester of a hydroxysulfonic acid of appropriate orientation, corresponding to the lactone of a hydroxycarboxylic acid. Several examples, among them propane sultone (the sultone of 3-hydroxypropane sulfonic acid), butane sultone (the sultone of 4-hydroxybutane sulfonic acid) and tolyl sultone (the sultone of benzyl alcohol ortho-sulfonic acid), are commercially available. To induce the combination, the reactants need merely be mixed intimately in the proper proportions and heated. The sultone is a ring, which in this reaction opens. The alcoholic function unites with the carboxyl group to form an ester linkage, while the sodium salt moiety is transferred from the carboxyl to the sulfonic group. The product is the sodium salt of a sulfoester of the original carboxylic acid.

The reaction is restricted, for the purposes of the present invention, to salicylic acid itself, or more precisely to its salts. That is to say, it cannot be carried out on a derivative of salicylic acid other than its simple salts. If it be attempted on a derivative which involves the carboxyl group, as the amide or an ester, no reaction will occur. The carboxylic acid salt is thus seen to be indispensable in the practice of the present invention. Similarly, if it be attempted upon a derivative which involves the hydroxylic function, as acetylsalicylic acid or a salt thereof, extensive decomposition takes place with liberation of free acetic and salicylic acids, and the desired product is not obtained. In order to prepare a sulfoester of acetylsalicylic acid, therefore, it is necessary first to prepare the sulfoester of salicylic acid, and subsequently to acylate this intermediate.

While the combination of sultone with carboxylic acid salt may be accomplished simply by heating in the absence of a solvent, a solvent is nevertheless desirable, as in this manner more intimate mixing is obtained and the sultone is prevented from subliming out of the reaction zone. The yield and purity of the product are thus improved. The usual solvents for sodium salicylate, namely water and lower alcohols, are not, however, suitable, because in them solvolysis of the salt occurs to some extent. As a result, the sultone reacts in part with the solvent, forming byproducts which must then be laboriously removed. This difficulty is obviated by use of a nonsolvolytic solvent. In this application dimethyl formamide has been found to be highly effective. It has very high solvent power for both reactants, and since it contains no acidic hydrogen, it is incapable of causing solvolysis of the salt.

Acylation of the intermediate is readily accomplished by the usual techniques. No complications are introduced by the fact that it is the sodium salt of a sulfoester which is to be acylated; the acylation reaction proceeds as smoothly as with salicylic acid itself. The acid anhydride is the reagent of choice. While an acid chloride may be used here, it is less desirable than the corresponding anhydride because the HCl liberated has a deleterious effect on the sodium sulfonate. The corresponding carboxylic acid itself may also be used, but is similarly undesirable because the water formed in the acylation tends to hydrolyze the sulfoester linkage to some extent.

Some examples of salicylic acid derivatives of this type have been tested biologically for toxicity and analgesic activity. The $LD_{50}$ was determined in mice, rats, rabbits and dogs by standard techniques, administering aqueous solutions intragastrically. The effectiveness as an analgesic was measured in rats by two methods: by the time elapsed before the animal attempted to escape from a standard heat stimulus applied to the tail, and by the voltage that must be applied to a rectal electrode to elicit a squeak from the animal. In both these methods, the effectiveness was established by finding the dose required to produce the same degree of analgesia as a specified dose of ordinary acetylsalicylic acid. The following table presents the results obtained with the represenative sodium γ-sulfopropyl acetylsalicylic ester and sodium δ-sulfobutyl acetylsalicylic ester prepared by acetylating the reaction products of sodium salicylate with propane and butane sultones respectively:

|  | Sodium γ-sulfopropyl Acetylsalicylic Ester | Sodium δ-sulfobutyl Acetylsalicylic Ester | Aspirin |
| --- | --- | --- | --- |
| $LD_{50}$ in rats mg./kg | 14,660 |  | 1,350 |
| $LD_{50}$ in mice mg./kg |  | 11,000 |  |
| Dose required for standard response to heat-avoidance test in rats mg./kg | 4.2 | 4.4 | 5 |
| Therapeutic ratio based on heat-avoidance test in rats | 3,500 | 2,500 | 270 |
| Dose required for standard response in electric shock test in rats mg./kg | 80 |  | 95 |
| Therapeutic ratio based on electric shock test in rats | 183 |  | 14.3 |

Sodium γ-sulfopropyl acetylsalicylic ester is thus shown to be about 120% as effective as acetylsalicylic acid itself, and less than 1/10 as toxic. The therapeutic ratio of this drug (the ratio of the $LD_{50}$ to the therapeutic dose) is therefore 13 times as favorable as for aspirin.

Sodium δ-sulfobutyl acetylsalicylic ester is similarly about 110% as effective as acetylsalicylic acid, and only about ⅛ as toxic. The therapeutic ratio is thus nine times as favorable.

Salicylic acid derivatives of this type have a very wide application. The high water solubility permits of their administration in a concentrated dose, and the fact that their solutions are effectively neutral and are not precipitated by either acids or bases makes them compatible with most foods, materia medica and biological fluids. They are well suited to hypodermic injection.

Example 1

*Sodium γ-sulfopropyl salicylic ester.*—One mole (160 gm.) of dry sodium salicylate and one mole (122 gm.) of propane sultone are ground together until a uniform mixture is obtained. This is placed in a loosely-stoppered flask which is immersed in an oil bath held at 130–150° C. The sultone first melts to form a paste with the sodium salicylate; shortly thereafter a rapid reaction sets in which soon transforms the whole to a uniform infusible white solid. When the reaction has subsided, the mass is cooled and dissolved in the minimum of boiling methanol. About 5 liters of solvent is required. The solution is filtered rapidly by gravity if not perfectly clear, and cooled strongly for 12 hours or longer. The product separates as warty nodules made up of rosettes of fine needles. It is collected on a filter, washed with a little cold methanol, and dried at about 80° C. The dry product is a snow-white powder, hygroscopic and very soluble in water to give a clear solution. The pH of such a solution is between 5 and 6; neither acid nor base produces any turbidity. About 230 gm. is obtained; by concentrating the methanolic mother liquors to around one-fifth their volume, a further crop of some 40 gm. may be recovered. The elementary analysis of this material corresponds to the hemihydrate of sodium γ-sulfopropyl salicylic ester.

|  | Calculated for $C_{10}H_{11}O_6SNa \cdot \frac{1}{2}H_2O$, percent | Found, percent |
| --- | --- | --- |
| Carbon | 41.3 | 41.3 |
| Hydrogen | 4.13 | 4.19 |
| Sulfur | 11.0 | 11.2 |
| Sodium | 7.90 | 7.94 |
| Water (Fisher-Johns) | 3.1 | 3.4 |

Example 2

*Sodium γ-sulfopropyl salicylic ester.*—One mole (160 gm.) of dry sodium salicylate and one mole (122 gm.) of propane sultone are placed in a reflux apparatus together with 300 cc. of dimethyl formamide. On warming, both solids dissolve completely. The resulting solution is gently refluxed for 15 to 30 minutes. At the end of this time the reaction mixture is cooled somewhat and the apparatus is revised to provide for vacuum distillation of the solvent. Dimethyl formamide is distilled off as completely as possible from a steam or boiling water bath under the lowest pressure readily attainable. The pressure may not be appreciably in excess of 30 mm. of mercury if the solvent is to be efficiently recovered. When no further distillation can be observed, the dry residue is recrystallized from methanol as in Example 1. A second recrystallization is here advisable to remove the last of the dimethyl formamide. The yield and properties of the product are the same as those cited in Example 1.

Example 3

*Sodium γ-sulfopropyl acetylsalicylic ester.*—One mole (282 gm.) of sodium γ-sulfopropyl salicylic ester is placed in a reflux apparatus. It is not necessary to use a purified product: the crude reaction product as prepared in either Example 1 or Example 2 above is entirely satisfactory. Acetic anhydride (2.5 moles, 250 cc.) is added, and the mixture is heated. The solid dissolves completely before the boiling point is reached. The solution is refluxed gently for 15 to 30 minutes, then cooled somewhat, and the solvent is removed as completely as possible by distillation in vacuo from a steam or boiling water bath. A second portion of 200 to 250 cc. of acetic anhydride is added, and the mixture is once more refluxed for a short time. The solvent is again evaporated as completely as possible in the same manner, to leave a syrupy residue which sets, on standing in the cold, to a crystalline cake. This is dissolved in 1200–1500 cc. of boiling 95% alcohol and quickly filtered, hot, by gravity, if not perfectly clear. The product separates from this solution, on standing for several hours in the cold, as tiny white plates. A second recrystallization is advisable if a crude intermediate prepared in dimethyl formamide was used. The final filter cake is stirred up thoroughly with 1000–1500 cc. of a volatile organic liquid which is miscible with alcohol but a non-solvent for the product, such as ether or acetone. The product should be pressed as dry as possible on the filter when this wash liquid is separated, as residual alcohol in the cake tends to interfere with the drying process. The last traces of solvent are evaporated in a warm air oven, starting at room temperature and increasing the heat gradually, as drying proceeds, to a maximum of 70–80° C. There is obtained about 250 gm. of a snow-white powder; by concentrating the alcoholic mother liquors to approximately ⅓ their volume another 50 gm. or so may be recovered. The product is somewhat hydroscopic and very soluble in water, dissolving to give a clear solution with a pH of 5 to 6. Neither acid nor base produces any turbidity. The elementary analysis of this material corresponds to sodium γ-sulfopropyl acetylsalicylic ester.

|  | Calculated for $C_{12}H_{13}O_7SNa$, percent | Found, percent |
| --- | --- | --- |
| Carbon | 44.4 | 44.3 |
| Hydrogen | 4.01 | 4.17 |
| Sulfur | 9.8 | 9.73 |
| Sodium | 7.09 | 7.08 |

*Example 4*

*Sodium γ-sulfopropyl acetylsalicylic ester.*—One mole (282 gm.) of sodium γ-sulfopropyl salicyclic ester is placed in a distillation apparatus. It is not necessary to use a purified product: the crude reaction product as prepared in either Example 1 or Example 2 above is entirely satisfactory. Acetic anhydride (5 moles, 500 cc.) is added, and the mixture is gradually brought to a boil. Solvent is very slowly distilled from the reaction at atmospheric pressure, with close attention to the vapor temperature at the still-head. This should be approximately 120° C. at the beginning of the distillation, and the rate at which liquid passes over should be controlled so that the vapor temperature does not exceed 135° C. until at least 50 cc. of distillate has been collected. The still-head temperature may thereafter rise to 140° C. or higher without harm. The atmospheric pressure distillation is continued until a total of approximately 200 cc. of distillate has been collected. The still is evacuated at this point, and removal of the solvent is continued, with steam or boiling water as the source of heat until no further distillate can be obtained. The residue is a syrup which sets, on cooling and standing, to a hard crystalline cake. This is recrystallized from alcohol, washed with ether or acetone and dried as described in the preceding Example 3. The yield and properties of the product are the same as those cited in Example 3.

*Example 5*

*Sodium δ-sulfobutyl salicylic ester.*—One mole (160 gm.) of dry sodium salicylate and one mole (136 gm.) of butane sultone are ground together until a uniform mixture is obtained. This is placed in a loosely-stoppered flask which is immersed in an oil bath held at 130–150° C. The paste of sultone and sodium salicylate undergoes a rapid reaction at this temperature which soon transforms the whole to a uniform white solid. When the reaction has subsided, the mass is cooled and dissolved in the minimum of boiling methanol. About 1.5 liters of solvent is required. The solution is filtered rapidly by gravity if not perfectly clear, and cooled strongly for 12 hours or longer. The product separates as a soft mass of fine granules. It is collected on a filter, washed with a little cold methanol, and dried at about 80° C. The dry product is a snow-white powder, hygroscopic and very soluble in water to give a clear solution. The pH of such a solution is between 5 and 6; neither acid nor base produces any turbidity. About 175 gm. is obtained by concentrating the methanolic mother liquors to around two-fifths their volume, a further crop of some 75 gm. may be recovered. The elementary analysis of this material corresponds to the hemimethanolate of sodium δ-sulfobutyl salicylic ester.

|  | Calculated for $C_{11}H_{13}O_6SNa \cdot \frac{1}{2}CH_3OH$, percent | Found, percent |
| --- | --- | --- |
| Carbon | 44.2 | 44.5 |
| Hydrogen | 4.8 | 4.6 |
| Sulfur | 10.2 | 9.8 |
| Sodium | 7.3 | 7.0 |

*Example 6*

*Sodium δ-sulfobutyl salicylic ester.*—One mole (160 gm.) of dry sodium salicylate and one mole (136 gm.) of butane sultone are placed in a reflux apparatus together with 300 cc. of dimethyl formamide. On warming, both reagents dissolve completely. The resulting solution is gently refluxed for 15 to 30 minutes. At the end of this time the reaction mixture is cooled somewhat and the apparatus is revised to provide for vacuum distillation of the solvent. Dimethyl formamide is distilled off as completely as possible from a steam or boiling water bath under the lowest pressure readily attainable. The pressure may not be appreciably in excess of 30 mm. of mercury if the solvent is to be efficiently recovered. When no further distillation can be observed, the dry residue is recrystallized from methanol as in Example 1. A second recystallization is here advisable to remove the last of the dimethyl formamide. The yield and properties of the product are the same as those cited in Example 5.

*Example 7*

*Sodium δ-sulfobutyl acetylsalicylic ester.*—One mole (296 gm.) of sodium δ-sulfobutyl salicylic ester is placed in a reflux apparatus. It is not necessary to use a purified product: the crude reaction product as prepared in either Example 1 or Example 2 above is entirely satisfactory. Acetic anhydrode (2.5 moles, 250 cc.) is added, and the mixture is heated. The solid dissolves completely before the boiling point is reached. The solution is refluxed gently for 15 to 30 minutes, then cooled somewhat, and the solvent is removed as completely as possible by distillation in vacuo from a steam or boiling water bath. A second portion of 200 to 250 cc. of acetic anhydride is added, and the mixture is once more refluxed for a short time. The solvent is again evaporated as completely as possible in the same manner, to leave a syrupy residue. This is dissolved in 1200–1500 cc. of boiling 99% alcohol and quickly filtered, hot, by gravity, if not perfectly clear. Dilute with an equal volume of acetone and chill thoroughly in the refrigerator. The product separates from this solution, on standing for several hours in the cold, as a somewhat gelatinous slurry. A second recrystallization is advisable if a crude intermediate prepared in dimethyl formamide was used. The final filter cake is stirred up thoroughly with 1000–1500 cc. of acetone. The product should be pressed as dry as possible on the filter when this wash liquid is separated, as residual alcohol in the cake tends to interfere with the drying process. The last traces of solvent are evaporated in a warm air oven, starting at room temperature and increasing the heat gradually, as drying proceeds, to a maximum of 70–80° C. There is obtained about 200 gm. of yellowish horn-like fragments; by concentrating the alcoholic mother liquors to approximately ⅕ their volume another 80 gm. or so may be recovered. The product is somewhat hygroscopic and very soluble in water, dissolving to give a clear solution with a pH of 5 to 6. Neither acid nor base produces any turbidity. The elementary analysis of this material corresponds to sodium δ-sulfobutyl acetylsalicylic ester.

|  | Calculated for $C_{13}H_{15}O_7SNa$, percent | Found, percent |
| --- | --- | --- |
| Carbon | 46.1 | 46.0 |
| Hydrogen | 4.4 | 4.7 |
| Sulfur | 9.5 | 9.4 |
| Sodium | 6.8 | 6.9 |

*Example 8*

*Sodium δ-sulfobutyl acetylsalicylic ester.*—One mole (296 gm.) of sodium δ-sulfobutyl salicylic ester is placed in a distillation apparatus. It is not necessary to use a purified product: the crude reaction product as prepared in either Example 1 or Example 2 above is entirely satisfactory. Acetic anhydride (5 moles, 500 cc.) is added, and the mixture is gradually brought to a boil. Solvent is very slowly distilled from the reaction at atmospheric pressure, with close attention to the vapor temperature at the still-head. This should be approximately 120° C. at the beginning of the distillation, and the rate at which liquid passes over should be controlled so that the vapor temperature does not exceed 135° C. until at least 50 cc. of distillate has been collected. The still-head temperature may thereafter rise to 140° C. or higher without harm. The atmospheric pressure distillation is continued until a total of approximately 200 cc. of distillate has been collected. The still is evacuated at this point, and removal of the solvent is continued, with steam or boiling water as the source of heat until no further distillate can be obtained. The residue is a syrup. This is recrystallized from alcohol, washed with acetone and dried as described in the preceding Example 7. The yield and properties of the product are the same as those cited in Example 7.

In addition to their effectiveness when tested biologically for toxicity and analgesic activity, certain derivatives of salicylic acid as prepared in accordance with this invention and illustrated in the foregoing examples have been used in pharmaceutical preparations and administered to human beings as analgesic and antipyretic pharmacological composition with marked success. For example a sodium γ-sulfopropylacetylsalicylate formulation in accordance with this invention has been administered clinically to human patients for the treatment of low level pain and fever. As thus administered, sodium γ-sulfopropylacetylsalicylate has proven to be an effective analgesic antipyretic. The human patients treated included children as young as eight months. The dosage ranges utilized were those recognized for conventional salicylate treatment, as little as one grain of sodium γ-sulfopropylacetylsalicylate administered twice a day having produced the desired analgesic antipyretic response.

The antipyretic value of the pharmacological agent of this invention is seen in the fact that during the above clinical administrations, body fever has been observed to decline an amount in the range of from one to four degrees F. per dose per four hour period. Likewise the effect of sodium γ-sulfopropylacetylsalicylate in relieving low level pain has been observed in that during periods of administration of the compound, clinical reports showed an absence of pain thus indicating decided analgesic activity.

The above clinical administrations were accompanied by no side effects or toxic complications in excess of those associated with conventional salicylate therapy.

The following examples are formulations of the analgesic and antipyretic compounds of this invention suitable for administration to human beings within the aforedescribed dosage ranges. In each of the following examples of liquid preparation the concentration of the analgesic antipyretic is equal to 1 grain per milliliter of solution.

*Example 9*

Sodium γ-sulfopropylacetylsalicylate _____ gm__ 54.1
Sucrose _____ gm__ 850
Water, q.s. ad 1000 gm.

*Example 10*

Sodium γ-sulfopropylacetylsalicylate _____ gm__ 54.1
Water _____ gm__ 61.6
Sorbitol, q.s. ad 1000 ml.

*Example 11*

Sodium γ-sulfopropylacetylsalicylate _____ gm__ 54.1
Saccharin _____ gm__ 1.1
Sucaryl _____ gm__ 24.9
Sodium benzoate _____ gm__ 0.9
Sodium phosphate monobasic _____ gm__ 2.0
Sodium phosphate dibasic, q.s. ad pH 5.5.
Flavoring _____ gm__ 0.5
Alcohol _____ gm__ 0.5
Water _____ gm__ 61.1
Sorbitol, q.s. ad 1000 ml.

*Example 12*

Sodium γ-sulfopropylacetylsalicylate _____ kg__ 246
Carboxymethyl cellulose, medium viscosity, type 70 _____ kg__ 4
Tween 20 _____ gal__ 1
Saccharin _____ kg__ 5
Sucaryl _____ kg__ 113
Sodium benzoate _____ kg__ 4
Sodium phosphate monobasic _____ kg__ 9
Sodium phosphate dibasic, q.s. ad pH 5.5.
Flavoring _____ kg__ 2
Alcohol _____ qt__ 2
Water, q.s. ad 1000 gal.

*Example 13*

Sodium δ-sulfobutylacetylsalicylate _____ gm__ 54.1
Sucrose _____ gm__ 850
Water, q.s. ad 1000 gm.

*Example 14*

Sodium δ-sulfobutylacetylsalicylate _____ gm__ 54.1
Water _____ ml__ 61.6
Sorbitol, q.s. ad 1000 ml.

*Example 15*

Sodium δ-sulfobutylacetylsalicylate _____ gm__ 54.1
Saccharin _____ gm__ 1.1
Sucaryl _____ gm__ 24.9
Sodium benzoate _____ gm__ 0.9
Sodium phosphate monobasic _____ gm__ 2.0
Sodium phosphate dibasic, q.s. ad pH 5.5.
Flavoring _____ gm__ 0.5
Alcohol _____ ml__ 0.5
Water _____ gm__ 61.1
Sorbitol, q.s. ad 1000 ml.

Example 16

| | | |
|---|---|---|
| Sodium δ-sulfobutylacetylsalicylate | kg | 246 |
| Carboxymethyl cellulose, medium viscosity, type 70 | kg | 4 |
| Tween 20 | gal | 1 |
| Saccharin | kg | 5 |
| Sucaryl | kg | 113 |
| Sodium benzoate | kg | 4 |
| Sodium phosphate monobasic | kg | 9 |
| Sodium phosphate dibasic, q.s. ad pH 5.5. | | |
| Flavoring | kg | 2 |
| Alcohol | qt | 2 |
| Water, q.s. ad 1000 gal. | | |

Example 17

| | | |
|---|---|---|
| Sodium β-sulfoethylacetylsalicylate | gm | 54.1 |
| Sucrose | gm | 850 |
| Water | gm | 1000 |

Example 18

| | | |
|---|---|---|
| Sodium β-sulfoethylacetylsalicylate | gm | 54.1 |
| Water | ml | 61.1 |
| Sorbitol, q.s. ad 1000 ml. | | |

Example 19

| | | |
|---|---|---|
| Sodium β-sulfoethylacetylsalicylate | gm | 54.1 |
| Saccharin | gm | 1.1 |
| Sucaryl | gm | 24.9 |
| Sodium benzoate | gm | 0.9 |
| Sodium phosphate monobasic | gm | 2.0 |
| Sodium phosphate dibasic, q.s. ad pH 5.5. | | |
| Flavoring | gm | 0.5 |
| Alcohol | ml | 0.5 |
| Water | gm | 61.6 |
| Sorbitol, q.s. ad 1000 ml. | | |

Example 20

| | | |
|---|---|---|
| Sodium β-sulfoethylacetylsalicylate | kg | 246 |
| Carboxymethyl cellulose, medium viscosity, type 70 | kg | 4 |
| Tween 20 | gal | 1 |
| Saccharin | kg | 5 |
| Sucaryl | kg | 113 |
| Sodium benzoate | kg | 4 |
| Sodium phosphate monobasic | kg | 9 |
| Sodium phosphate dibasic, q.s. ad pH 5.5. | | |
| Flavoring | kg | 2 |
| Alcohol | qt | 2 |
| Water | gal | 1000 |

Example 21

| | | |
|---|---|---|
| Sodium o-sulfobenzylacetylsalicylate | gm | 54.1 |
| Sucrose | gm | 850 |
| Water, q.s. ad 1000 gm. | | |

Example 22

| | | |
|---|---|---|
| Sodium o-sulfobenzylacetylsalicylate | gm | 54.1 |
| Water | ml | 0.5 |
| Sorbitol, q.s. ad 1000 ml. | | |

Example 23

| | | |
|---|---|---|
| Sodium o-sulfobenzylacetylsalicylate | gm | 54.1 |
| Saccharin | gm | 1.1 |
| Sucaryl | gm | 24.9 |
| Sodium benzoate | gm | 0.9 |
| Sodium phosphate monobasic | gm | 2.0 |
| Sodium phosphate dibasic, q.s. ad pH 5.5. | | |
| Flavoring | gm | 0.5 |
| Alcohol | ml | 0.5 |
| Water | ml | 61.1 |
| Sorbitol, q.s. ad 1000 ml. | | |

Example 24

| | | |
|---|---|---|
| Sodium o-sulfobenzylacetylsalicylate | kg | 246 |
| Carboxymethyl cellulose, medium viscosity, type 70 | kg | 4 |
| Tween 20 | gal | 1 |
| Saccharin | kg | 5 |
| Sucaryl | kg | 113 |
| Sodium benzoate | kg | 4 |
| Sodium phosphate monobasic | kg | 9 |
| Sodium phosphate dibasic. | | |
| Flavoring | kg | 2 |
| Alcohol | qt | 2 |
| Water, q.s. ad 1000 gal. | | |

Additional formulations of the pharmacological compounds of this invention suitable for administration to human beings in solid form within the previously indicated dosage ranges are illustrated by the following examples:

LOZENGES

Example 25

| | | |
|---|---|---|
| Sodium β-sulfoethylacetylsalicylate | kg | 80 |
| Sucrose, fine powder | kg | 250 |
| Corn syrup | kg | 20 |
| Saccharin | kg | 7 |
| Flavoring | gm | 400 |
| Magnesium stearate | kg | 10 |

Press into tablets of 5.5 grains each, containing 1.25 grains of sodium β-sulfoethylacetylsalicylate per lozenge.

Example 26

| | | |
|---|---|---|
| Sodium γ-sulfopropylacetylsalicylate | kg | 80 |
| Sucrose, fine powder | kg | 250 |
| Corn syrup | kg | 20 |
| Saccharin | kg | 7 |
| Flavoring | gm | 400 |
| Magnesium stearate | kg | 10 |

Press into tablets of 5.5 grains each, containing 1.25 grains of sodium γ-sulfopropylacetylsalicylate per lozenge.

Example 27

| | | |
|---|---|---|
| Sodium δ-sulfobutylacetylsalicylate | kg | 80 |
| Sucrose, fine powder | kg | 250 |
| Corn syrup | kg | 20 |
| Saccharin | kg | 7 |
| Flavoring | gm | 400 |
| Magnesium stearate | kg | 10 |

Press into tablets of 5.5 grains each, containing 1.25 grains of sodium δ-sulfobutylacetylsalicylate per lozenge.

Example 28

| | | |
|---|---|---|
| Sodium o-sulfobenzylacetylsalicylate | kg | 80 |
| Sucrose, fine powder | kg | 250 |
| Corn syrup | kg | 20 |
| Saccharin | kg | 7 |
| Flavoring | gm | 400 |
| Magnesium stearate | kg | 10 |

Press into tablets of 5.5 grains each, containing 1.25 grains of sodium o-sulfobenzylacetylsalicylate per lozenge.

TABLETS

Example 29

| | | |
|---|---|---|
| Sodium o-sulfobenzylacetylsalicylate | kg | 333 |
| Sucrose, fine powder | kg | 45 |
| Corn syrup | kg | 20 |

Press into tablets of 6 grains each containing 5 grains of sodium o-sulfobenzylacetylsalicylate per tablet and coat with sugar glaze.

Example 30

| | | |
|---|---|---|
| Sodium β-sulfoethylacetylsalicylate | kg | 333 |
| Sucrose, fine powder | kg | 45 |
| Corn syrup | kg | 20 |

Press into tablets of 6 grains each containing 5 grains of sodium β-sulfoethylacetylsalicylate per tablet and coat with sugar glaze.

Example 31

| | | |
|---|---|---|
| Sodium γ-sulfopropylacetylsalicylate | kg | 333 |
| Sucrose, fine powder | kg | 45 |
| Corn syrup | kg | 20 |

Press into tablets of 6 grains each containing 5 grains of sodium γ-sulfopropylacetylsalicylate per tablet and coat with sugar glaze.

Example 32

| | | |
|---|---|---|
| Sodium δ-sulfobutylacetylsalicylate | kg | 333 |
| Sucrose, fine powder | kg | 45 |
| Corn syrup | kg | 20 |

Press into tablets of 6 grains each containing 5 grains of sodium δ-sulfobutylacetylsalicylate per tablet and coat with sugar glaze.

Although this invention has been described in terms of preferred example, it will be understood that various modifications and supplemental steps may be employed in carrying out the process as defined in the appended claims. For instance, it will be apparent to those skilled in the general field of this invention that other non-solvolytic ionizing solvents may be substituted for dimethyl formamide and that other sultones, such as tolyl sultone (the sultone of benzyl alcohol o-sulfonic acid) may replace propane sultone in the addition step of the reaction. Moreover, departures may be made in the formulation of preparations of pharmaceutical compositions as herein described both with respect to the specific material used and the percentage composition thereof, all without departing from the spirit and the scope of this invention as defined in the appended claims.

Having thus described my invention, I claim:

1. A pharmaceutical preparation for internal administration in liquid form having analgesic and antipyretic properties consisting essentially of an aqueous solution of a compound selected from the group consisting of sodium β-sulfoethylacetyl salicylate, sodium δ-sulfobutylsalicylate, sodium δ-sulfobutylacetylsalicylate and sodium o-benzylacetylsalicylate.

2. A pharmaceutical preparation for internal administration in liquid form having analgesic and antipyretic properties consisting essentially of an edible sugar, water and a compound selected from the group consisting of sodium β-sulfoethylacetyl salicylate, sodium δ-sulfobutylsalicylate, sodium δ-sulfobutylacetylsalicylate and sodium o-benzylacetylsalicylate.

3. A pharmaceutical preparation for internal administration in solid form having analgesic and antipyretic properties consisting essentially of a compound selected from the group consisting of sodium β-sulfoethylacetyl salicylate, sodium δ-sulfobutylsalicylate, sodium δ-sulfobutylacetylsalicylate and sodium o-benzylacetylsalicylate, sucrose and corn syrup.

4. A pharmaceutical preparation for internal administration in solid form having analgesic and antipyretic properties consisting essentially of a compound selected from the group consisting of sodium β-sulfoethylacetyl salicylate, sodium δ-sulfobutylsalicylate, sodium δ-sulfobutylacetylsalicylate and sodium o-benzylacetylsalicylate, sucrose, corn syrup, saccharin, flavoring and magnesium stearate.

References Cited by the Examiner

UNITED STATES PATENTS

| 2,179,209 | 11/39 | Daimler et al. | 260—473 |
|---|---|---|---|
| 2,900,410 | 8/59 | Schenck | 167—65 X |
| 2,904,469 | 9/59 | Nashed. | |

FOREIGN PATENTS

| 273,221 | 4/14 | Germany. |
|---|---|---|

JULIAN S. LEVITT, *Primary Examiner.*

M. O. WOLK, *Examiner.*

UNITED STATES PATENT OFFICE
CERTIFICATE OF CORRECTION

Patent No. 3,181,993                         May 4, 1965

Remsen T. Schenck

It is hereby certified that error appears in the above numbered patent requiring correction and that the said Letters Patent should read as corrected below.

Column 3, line 29, for "deleteious" read -- deleterious --; column 7, line 34, for "Eyample" read -- Example --; column 8, line 25, for "gm" read -- ml --.

Signed and sealed this 7th day of December 1965.

(SEAL)
Attest:

ERNEST W. SWIDER                         EDWARD J. BRENNER
Attesting Officer                           Commissioner of Patents